United States Patent
Nagasawa

(10) Patent No.: US 11,325,512 B2
(45) Date of Patent: May 10, 2022

(54) SEAT DEVICE FOR VEHICLE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 17/082,340

(22) Filed: Oct. 28, 2020

(65) Prior Publication Data
US 2021/0197697 A1 Jul. 1, 2021

(30) Foreign Application Priority Data
Dec. 27, 2019 (JP) .............................. JP2019-239813

(51) Int. Cl.
*B60N 2/64* (2006.01)
(52) U.S. Cl.
CPC .................................. *B60N 2/646* (2013.01)
(58) Field of Classification Search
CPC ........................................................ B60N 2/646
See application file for complete search history.

(56) References Cited

U.S. PATENT DOCUMENTS

| | | | | |
|---|---|---|---|---|
| 9,161,630 B2* | 10/2015 | Brncick | ................ | B60N 2/646 |
| 2012/0119551 A1* | 5/2012 | Brncick | ................ | B60N 2/646 |
| | | | | 297/284.2 |
| 2018/0339619 A1* | 11/2018 | Inoue | .................... | B60N 2/646 |
| 2021/0197698 A1 | 7/2021 | Nagasawa | | |

FOREIGN PATENT DOCUMENTS

| | | | |
|---|---|---|---|
| JP | 2006-213103 A | 8/2006 | |
| WO | WO-02057110 A1 * | 7/2002 | ............ B60N 2/646 |

OTHER PUBLICATIONS

Office Action dated Oct. 14, 2021 in U.S. Appl. No. 17/082,365 (6 pages).

* cited by examiner

*Primary Examiner* — Anthony D Barfield
(74) *Attorney, Agent, or Firm* — Smith, Gambrell & Russell, LLP

(57) ABSTRACT

A seat device for a vehicle includes a seat cushion, a slow deformation portion, and a rearward-tilt member. An occupant in the vehicle is to be seated on the seat cushion. The slow deformation portion is disposed in at least a portion of the seat cushion and is configured in such a manner that deformation of the deformation portion proceeds as a result of a load to be applied continuously to the slow deformation portion. The rearward-tilt member is disposed in a load direction in an inner portion of the slow deformation portion. When the slow deformation portion is deformed by the load, the rearward-tilt member is tilted rearward from its position before the load is applied.

22 Claims, 7 Drawing Sheets

LOAD APPLICATION SURFACE

LOAD APPLICATION SURFACE

SEAT DEVICE FOR VEHICLE

CROSS-REFERENCE TO RELATED APPLICATIONS

The present application claims priority from Japanese Patent Application No. 2019-239813 filed on Dec. 27, 2019, the entire contents of which are hereby incorporated by reference.

BACKGROUND

The disclosure relates to a seat device for a vehicle.

A seat device is used in a vehicle (Japanese Unexamined Patent Application Publication No. 2006-213103).

SUMMARY

An aspect of the disclosure provides a seat device for a vehicle. The device includes a seat cushion, a slow deformation portion, and a rearward-tilt member. An occupant in the vehicle is to be seated on the seat cushion. The slow deformation portion is disposed in at least a portion of the seat cushion and is configured in such a manner that deformation of the slow deformation portion proceeds as a result of a load to be applied continuously to the slow deformation portion. The rearward-tilt member is disposed in a load direction in an inner portion of the slow deformation portion. When the slow deformation portion is deformed by the load, the rearward-tilt member is tilted rearward from a position thereof before the load is applied.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

DETAILED DESCRIPTION

A seat device for a vehicle has a correct seating location regarding a seat cushion. By sitting in the seating location, an occupant is suppressed from getting tired easily, even when sitting for a long time.

There is, however, a possibility of an occupant on a vehicle not sitting in a correct seating location in a seat cushion. For example, an occupant may sit in a posture tilted such that the waist is displaced to the front from the correct seating location. In this case, a load applied to the waist may increase, which causes the occupant to get tired easily.

When an occupant sits in a posture tilted such that the waist is displaced to the front from the correct seating location, there is a possibility of the waist of the occupant being further displaced to the front during sitting.

Thus, an improvement of seat devices for vehicles is desirable.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

Figure 1A:
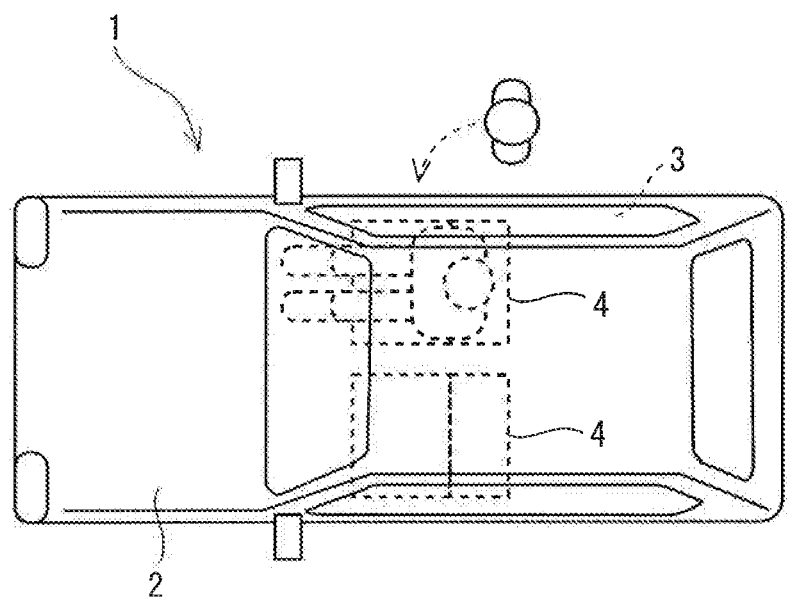
FIG. 1A and FIG. 1B illustrate an automobile in which a seat device according to an embodiment of the disclosure is employed.
Figure 1B:
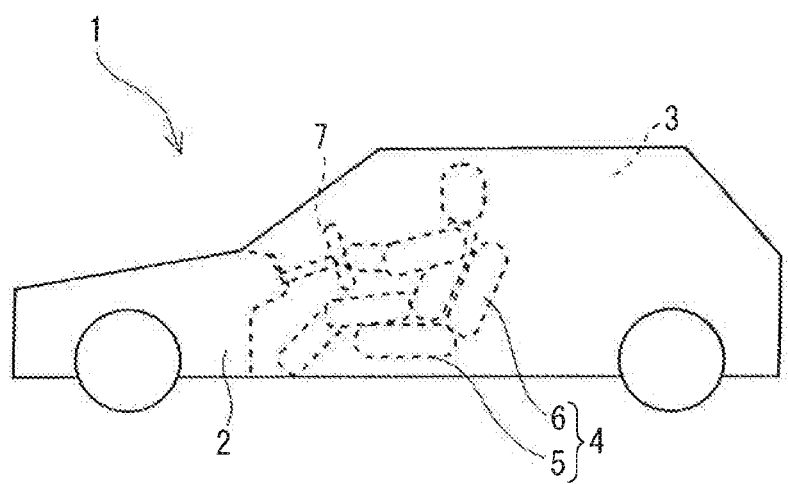

FIG. 1A and FIG. 1B illustrate an automobile 1 in which a seat device 10 according to an embodiment of the disclosure is employed.

FIG 1A is a top view. FIG. 1B is a left side view.

The automobile 1 is an example of a vehicle. The automobile 1 may be an automobile that uses an internal combustion engine as a power source of traveling, an automobile that uses stored power of a battery as the power source of travelling, or an automobile including a combination thereof.

The automobile 1 in FIG. 1A and FIG. 1B includes a body 2 and a cabin 3 disposed in a center portion of the body 2 in a front-rear direction. In the cabin 3, a seat 4 on which an occupant in the automobile 1 is to be seated is disposed. FIG. 1A and FIG. 1B illustrate, of the seats 4 disposed side by side at the front and the rear, independent seats on the front side. The seat 4 includes a seat cushion 5 on which the buttocks of an occupant are to be placed, and a back cushion 6 that stands at the rear edge of the seat cushion 5.

In front of an occupant sitting on the seat 4, a handle 7 projecting rearward from a dashboard is disposed. An occupant operates traveling of the automobile 1 and the like by operating the handle 7, and foot pedals and a shift lever, which are not illustrated, while sitting on the seat 4.

Figure 2A:
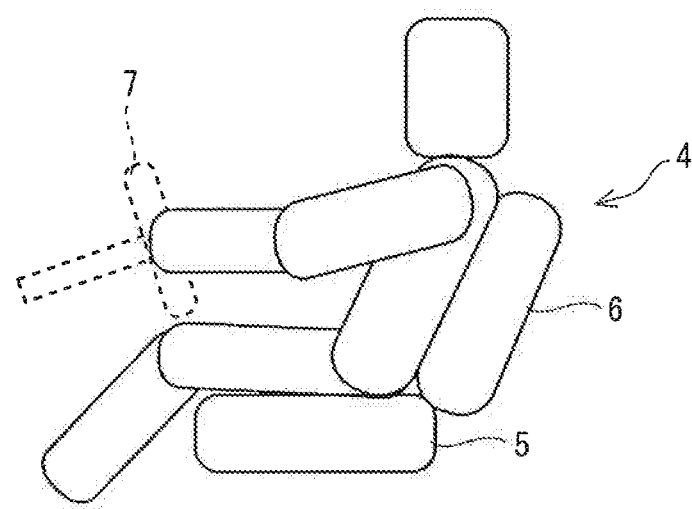
FIG. 2A and FIG. 2B illustrate a sitting state of an occupant on the seat device of the automobile in FIG. 1A and FIG. 1B.
Figure 2B:
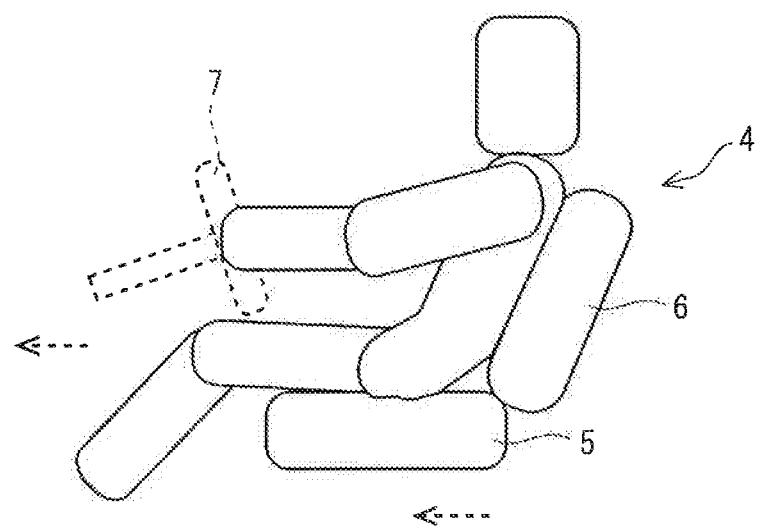

FIG. 2A and FIG. 2B illustrate a sitting state of an occupant on the seat device 10 of the automobile 1 in FIG. 1A and FIG. 1B.

FIG. 2A illustrates a state in which an occupant sits on the seat 4 with the waist standing along the back cushion 6. In this case, the buttocks of the occupant are placed in a correct seating location at a rear portion of the seat cushion 5.

By thus sitting in the correct seating location, the occupant is suppressed from get tired easily, even when sitting for a long time.

FIG. 2B illustrates a state in which an occupant sits on the seat 4 with the waist separated forward from the back cushion 6. In this case, the buttocks of the occupant are separated forward from the rear portion of the seat cushion 5 and tilted.

For example, when an occupant does not sit, as illustrated in FIG. 2B, in the correct seating location in the seat cushion 5, a load applied to the waist may increase. There is a possibility of the occupant getting tired easily.

As illustrated in FIG. 2B, when an occupant sits with the waist tilted to be displaced to the front from the correct seating location, there is a possibility of the waist of the occupant being further displaced easily to the front during sitting. For example, when stopping of the vehicle is performed during traveling, there is a possibility of the waist of the occupant being further displaced to the front.

Thus, an improvement of the seat device 10 of the automobile 1 is desirable.

Figure 3A:
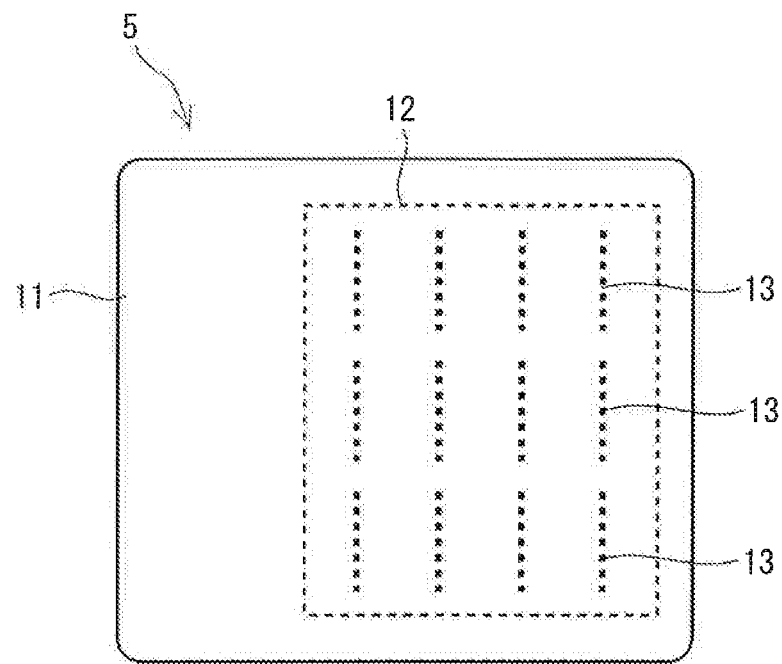
FIG. 3A and FIG. 3B schematically illustrate a structure of a seat cushion of the seat device according to a first embodiment of the disclosure.
Figure 3B:
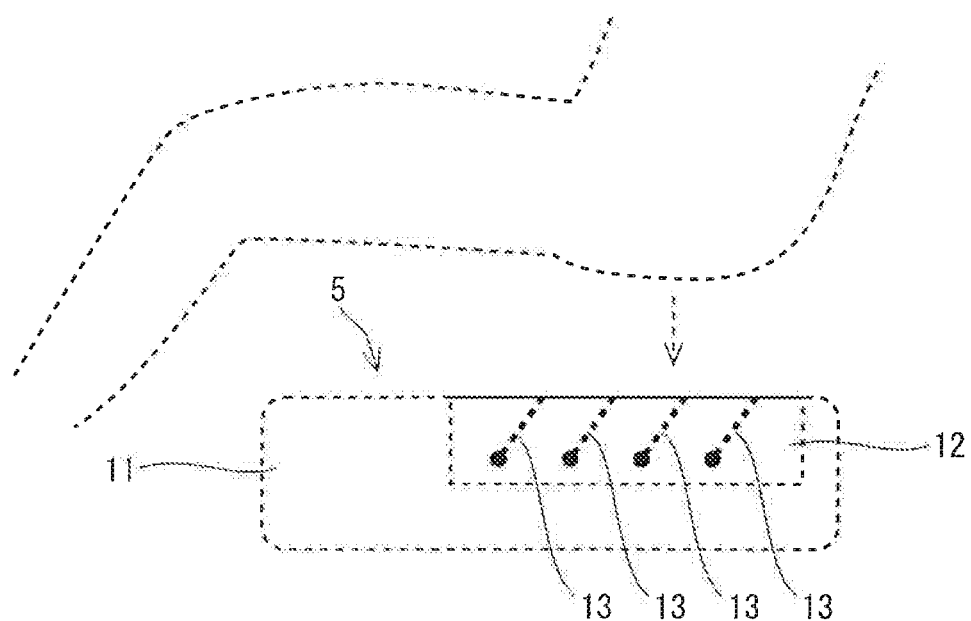

FIG. 3A and FIG. 3B schematically illustrate a structure of the seat cushion 5 of the seat device 10 according to a first embodiment of the disclosure.

FIG. 3A is a top view of the seat cushion 5. FIG. 3B is a side view of the seat cushion 5.

The seat cushion 5 in FIG. 3A and FIG. 3B includes a cushion body 11 that forms the entirety of a seat on which an occupant in the automobile 1 is to be seated, a slow deformation foam 12, and a plurality of rearward-tilt elastic plates 13.

The cushion body 11 forms the entirety of the seat of the seat device 10. As with a normal seat device 10, for example, a spring and a frame material that are made of metal may be disposed at the periphery and a lower portion of the cushion body 11. The cushion body 11 may include an urethane material or the like, which is a material included in the normal seat device 10, and may include a material having a characteristic of being easily flexible and soft so as to be easily compression deformed even when, for example, instantaneously receiving a load.

The slow deformation foam 12 is housed in an upper surface recess in a rear portion of the cushion body 11. The upper surface recess in FIG. 3A and FIG. 3B has a substantially rectangular shape and is disposed in a portion of the cushion body 11 from a rear portion to a center portion. The slow deformation foam 12 may have a rectangular shape having the same size as that of the substantially rectangular upper surface recess. The slow deformation foam 12 and the cushion body 11 may be bonded to each other by an adhesive or the like. Consequently, the slow deformation foam 12 is disposed in an area from a rear portion on which the buttocks of an occupant in a correct seating location in FIG. 2A are to be placed to a portion on the front side of the rear portion.

The slow deformation foam 12 may include a low-resilience material in which compression deformation do not easily proceed compared with the cushion body 11, which is the other portion of the seat cushion 5. The use of the low-resilience material causes the slow deformation foam 12 not to be easily compression deformed by an instantaneous load. The slow deformation foam 12 becomes such that compression deformation thereof proceeds as a result of a load being applied continuously for a certain period of time. The slow deformation foam 12 has a characteristic of being hard, in which compression deformation proceeds belatedly compared with the cushion body 11. Consequently, the load of an occupant sitting on the seat cushion 5 is applied to the slow deformation foam 12 more efficiently than to the cushion body 11.

The rearward-tilt elastic plates 13 are plate-shaped elastic plates. The plate-shaped rearward-tilt elastic plates 13 are arranged to stand in an inner portion of the slow deformation foam 12 so as to extend in an up-down direction. In FIG. 3A and FIG. 3B, the rearward-tilt elastic plates 13 are disposed to be slightly tilted rearward, compared with the up-down direction, in a state in which no load is applied thereto. Consequently, the rearward-tilt elastic plates 13 are disposed in the up-down direction, which corresponds to a load direction, in the inner portion of the slow deformation foam 12.

The plurality of plate-shaped rearward-tilt elastic plates 13 are also disposed side by a side in the vehicle width direction and the front-rear direction of the automobile 1. In FIG. 3A and FIG. 3B, four rows of the plurality of rearward-tilt elastic plates 13 are disposed side by side in the front-rear direction. Each row includes three rearward-tilt elastic plates 13 disposed side by side in the vehicle width direction. Consequently, in an area in the seat cushion 5 where the slow deformation foam 12 is disposed, the rearward-tilt elastic plates 13 are disposed side by side to be spaced apart from each other so that the plurality of rearward-tilt elastic plates 13 can be tilted in the front-rear direction of the automobile 1 independently from each other. Each of the plate-shaped rearward-tilt elastic plates 13 has a shape in which the width in the vehicle width direction of the automobile 1 is larger than the thickness in the front-rear direction of the automobile 1.

The rearward-tilt elastic plates 13 may include a material that is deformable so as to be relatively easily curved when a compressing force is applied thereto such that the plates are curved. Consequently, the rearward-tilt elastic plates 13 is suppressed from easily coming into contact with the sitting occupant strongly compared with the slow deformation foam 12. The rearward-tilt elastic plates 13 are suppressed from easily giving discomfort to the sitting occupant.

Figure 4A:
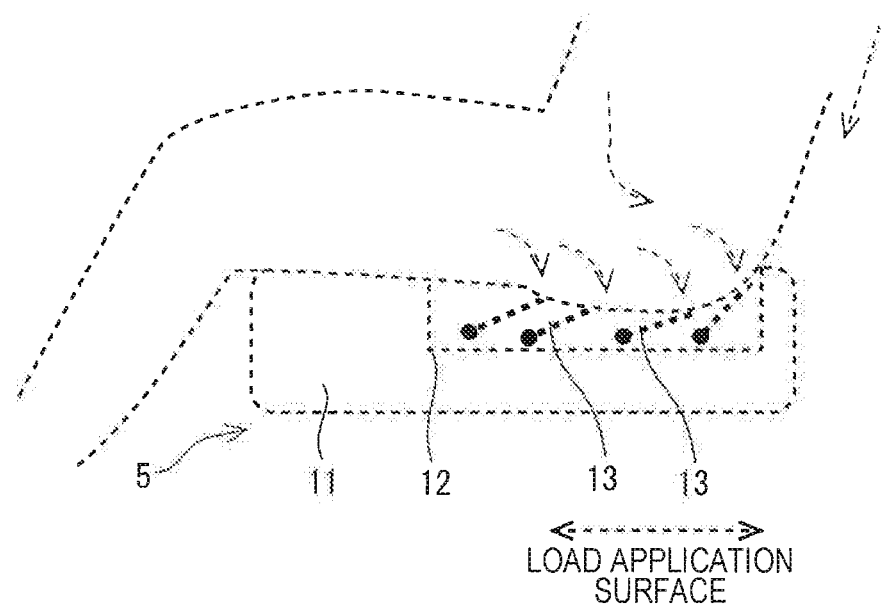
FIG. 4A and FIG. 4B illustrate a sitting state of an occupant on the seat cushion in FIG. 3A and FIG. 3B.
Figure 4B:
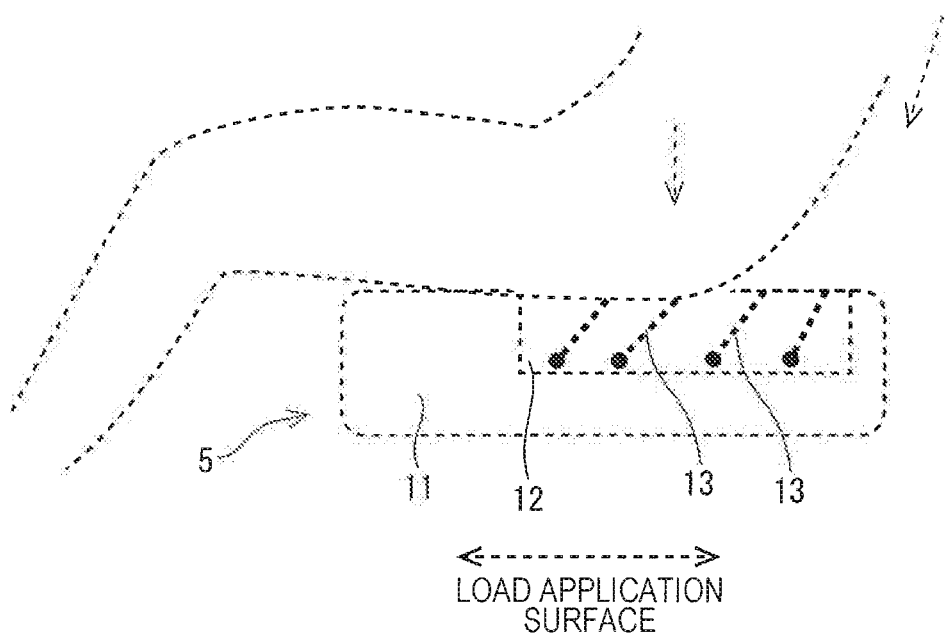

FIG. 4A and FIG. 4B illustrate a sitting state of an occupant on the seat cushion 5 in FIG. 3A and FIG. 3B.

The plurality of rearward-tilt elastic plates 13 are disposed side by side in an area from the rear portion, which is the correct seating location in the seat cushion 5, to the center portion, which is on the front side of the correct seating location.

FIG. 4A illustrate a state in which an occupant sits in the correct seating location in the seat cushion 5. The load of the buttocks of the occupant sitting in the correct seating location is continuously applied to be concentrated on the slow deformation foam 12. When being applied with the concentrated strong load, the slow deformation foam 12 is largely compression deformed as illustrated in FIG. 4A. In the inner portion of the compression deformed slow deformation foam 12, the rearward-tilt elastic plates 13 are largely tilted rearward by following the deformation. Each rearward-tilt elastic plate 13 is tilted rearward, in accordance with the load applied thereto, from the position thereof before the load is applied. The rearward-tilt elastic plates 13 that are largely tilted rearward become like a substantially flat surface on the lower side of the buttocks of the occupant sitting in the correct seating location. Consequently, the rearwardly tilted rearward-tilt elastic plates 13 can function to cause the buttocks of the occupant sitting in the correct seating location not to further sink downward. Moreover, as a result of the rearward-tilt elastic plates 13 being largely tilted rearward, the waist part of the occupant is slightly led to the rear, when the occupant sits in the correct seating location, toward a corner formed at a coupled portion between the seat cushion 5 and the back cushion 6. The waist part of the correctly sitting occupant is slightly raised in the correct seating location due to the back of the occupant being in contact with the back cushion 6. Consequently, the waist part of the occupant is not easily moved to the front from the correct seating location.

FIG. 4B illustrates a state in which an occupant sits in a portion displaced to the front from the correct seating location in the seat cushion 5. The load of the buttocks of the occupant sitting in the portion displaced to the front from the correct seating location is dispersed and continuously applied to the slow deformation foam 12. A load application surface is increased compared with that in FIG. 4A. When being applied with the dispersed load continuously, the slow deformation foam 12 is compression deformed as illustrated in FIG. 4B. The amount of compression deformation of the slow deformation foam 12 in this case is small compared with that in FIG. 4A. Each rearward-tilt elastic plate 13 is tilted rearward, in accordance with the load applied thereto, from the position thereof before the load is applied. In the inner portion of the compression deformed slow deformation foam 12, the rearward-tilt elastic plates 13 are tilted rearward by following the deformation but is not tilted rearward as largely as in FIG. 4A. The oblique orientation is maintained. The rearward-tilt elastic plates 13 come into contact with the buttocks of the occupant sitting in a portion displaced to the front of the correct seating location, from the front so as to hold the buttocks. Consequently, the buttocks of the occupant sitting in the portion displaced to the front from the front side of the correct seating location are supported from the front by the rearwardly tilted rearward-tilt elastic plates 13. The buttocks of the occupant sitting in the portion displaced to the front from the correct seating location are supported from the front not to be displaced to the front during sitting, for example, at the time of deceleration.

As described above, in the seat device 10 according to the present embodiment, the slow deformation foam 12 in which compression deformation proceeds as a result of a load being continuously applied thereto is disposed in at least a portion of the seat cushion 5 on which an occupant in the automobile 1 is to be seated, and the rearward-tilt elastic plates 13 is disposed in the load direction in the inner portion of the slow deformation foam 12. When the slow deformation foam 12 is deformed by a load, the rearward-tilt elastic plates 13 are tilted rearward from the position thereof before the load is applied. The slow deformation foam 12 includes a low-resilience material that is not easily deformed compared with a material included in other portions of the seat cushion 5. Therefore, the buttocks of the occupant sitting on the seat cushion 5 are rearwardly supported from the front side by the rearward-tilt elastic plates 13 that are tilted rearward in the inner portion of the slow deformation foam 12 deformed by the load.

Even when the occupant sits, not in the correct seating location in the seat cushion 5, with the waist tilted forward, the buttocks of the occupant sitting on the seat cushion 5 are not easily further displaced forward during sitting. In particular, when the waist is tilted forward during sitting, the load is easily dispersed in a wide area, and the compression deformation of the slow deformation foam 12 decreases. As a result, the rearward tilt degree of the plurality of rearward-tilt elastic plates 13 decreases, compared with that when the occupant sits in the correct seating location, and the occupant is suppressed from being further displaced to the front during sitting.

The buttocks of the occupant sitting on the seat cushion 5 are pushed rearward in some circumstances during sitting by the rearwardly tilted rearward-tilt elastic plates 13 and caused to easily return toward the correct seating location in the seat cushion 5.

In particular, as a result of a plurality of the rearward-tilt elastic plates 13 being disposed in the area in the seat cushion 5 where the slow deformation foam 12 is disposed and the plurality of rearward-tilt elastic plates 13 being disposed side by side to be spaced apart from each other so that the rearward-tilt elastic plates 13 can be tilted independently from each other in the front-rear direction of the automobile 1, the rearward-tilt elastic plates 13 rearwardly tilted during sitting can function to push back the buttocks of the occupant sitting on the seat cushion 5 to the rear and return the buttocks to the correct seating location in the seat cushion 5. As a result of the plurality of rearward-tilt elastic plates 13 being disposed in an area in the seat cushion 5 from the correct seating location to a portion on the front side of the seating location, the buttocks of the occupant can be returned to the correct seating location in the seat cushion 5. Even when the waist is tilted forward when an occupant sits, as a result of the buttocks being returned to the correct seating location during sitting, the occupant is suppressed from getting tired easily even when sitting for a long period of time.

In the present embodiment, each rearward-tilt elastic plate 13 has a shape in which the width in the vehicle width direction of the automobile 1 is larger than the width in the front-rear direction of the automobile 1. Consequently, the rearward-tilt elastic plates 13 are not easily tilted in the vehicle width direction of the automobile 1 and are tilted in the front-rear direction of the automobile 1. Even when no load is applied to the rearward-tilt elastic plates 13 in the standing direction thereof, the rearward-tilt elastic plates 13 are not easily tilted obliquely and are easily tilted toward the rear. Consequently, the rearward-tilt elastic plates 13 easily function to rearwardly support the waist of the sitting occupant during sitting.

In the above-described embodiment, the plurality of rearward-tilt elastic plates 13 are disposed side by side together with the slow deformation foam 12 in an area in the seat cushion 5 from the correct seating location to a center portion of the seating location.

Alternatively, for example, the plurality of rearward-tilt elastic plates 13 may be disposed together with the slow deformation foam 12 partially in the rear portion of the seat cushion 5.

The plurality of the rearward-tilt elastic plates 13 may be disposed together with the slow deformation foam 12, for example, substantially entirely from the rear portion to the front portion of the seat cushion 5.

Figure 5:
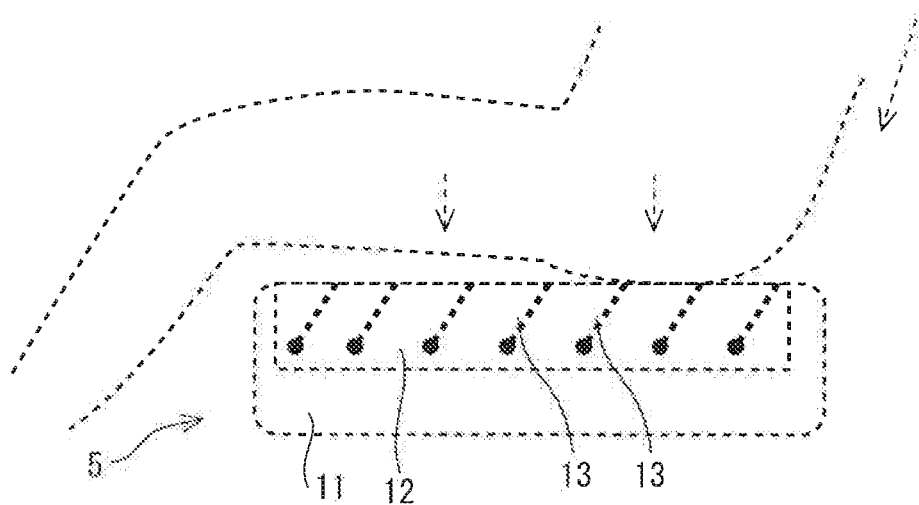
FIG. 5 schematically illustrates a structure of a seat cushion according to a modification of the seat cushion in FIG. 3.

FIG. 5 schematically illustrates a structure of the seat cushion 5 according to a modification of FIG. 3.

In FIG. 5, the plurality of rearward-tilt elastic plates 13 may be disposed together with the slow deformation foam 12 substantially entirely from the front portion to the rear portion of the seat cushion 5. Even in this case, the rearwardly tilted rearward-tilt elastic plates 13 can function to support from the front the buttocks of the occupant sitting in a portion displaced to the front from the correct seating location. The buttocks of the occupant sitting in the portion displaced to the front from the correct seating location are supported from the front not to be displaced to the front during sitting, for example, at the time of deceleration.

Second Embodiment

Next, the seat device 10 of the automobile 1 according to a second embodiment of the disclosure will be described. In the present embodiment, illustration and description of the same configurations as those in the above-described embodiment are omitted by using identical signs. In the following description, differences from the above-described embodiment will be mainly described.

Figure 6A:
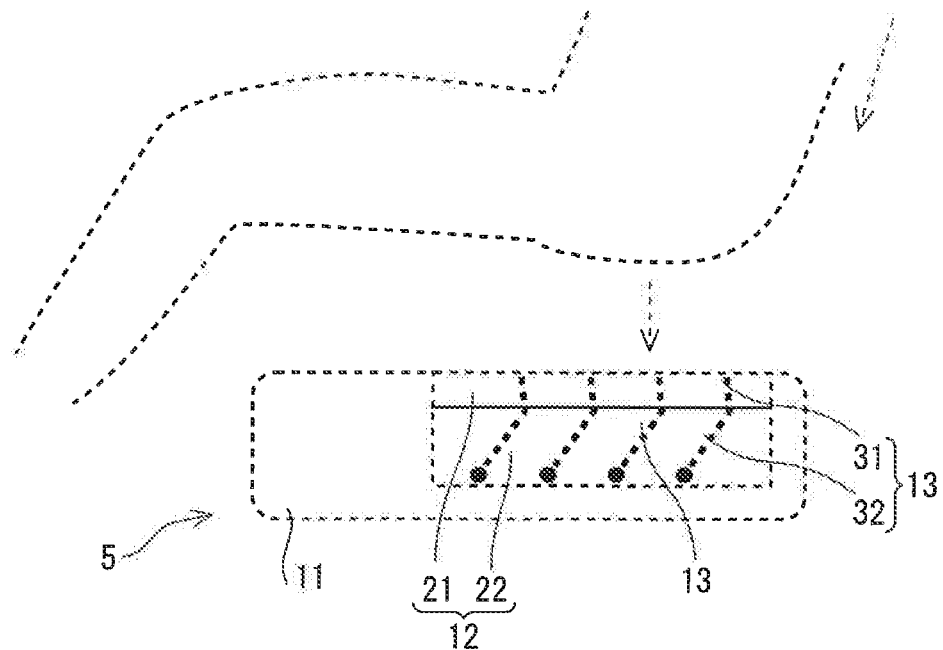
FIG. 6A and FIG. 6B schematically illustrate a structure of a seat cushion of a seat device according to a second embodiment of the disclosure.
Figure 6B:
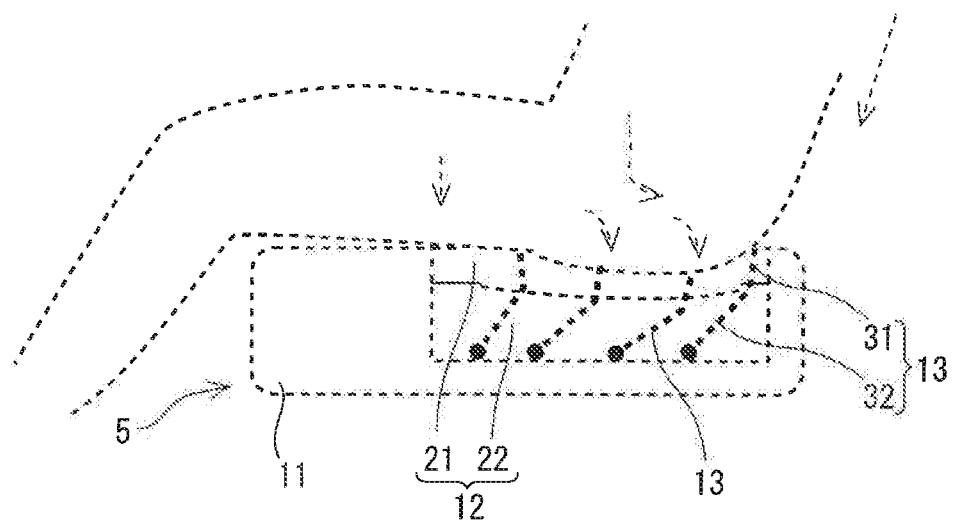

FIG. 6A and FIG. 6B schematically illustrate a structure of the seat cushion 5 of the seat device 10 according to the second embodiment of the disclosure.

FIG. 6A illustrates a state before seating. FIG. 6B illustrates a state after seating.

The seat cushion 5 in FIG. 6A and FIG. 6B includes the cushion body 11, a first slow deformation foam 21, a second slow deformation foam 22, and a plurality of the rearward-tilt elastic plates 13.

The first slow deformation foam 21 and the second slow deformation foam 22 are housed in an upper surface recess in a rear portion of the cushion body 11. The first slow deformation foam 21 is disposed on the second slow deformation foam 22 so as to overlap each other. The first slow deformation foam 21 and the second slow deformation foam 22 overlap each other in the load direction.

The first slow deformation foam 21 and the second slow deformation foam 22 have mutually different deformation characteristics with respect to load application. The first slow deformation foam 21 includes, for example, a low-resilience material having a characteristic of being easily compression deformed compared with the second slow deformation foam 22. The first slow deformation foam 21 may include, for example, a low-resilience material having a characteristic of not being easily compression deformed compared with the second slow deformation foam 22.

In the present embodiment, as illustrated in FIG. 6A, each of the rearward-tilt elastic plates 13 disposed in the inner portion of the slow deformation foam 12 so as to be tilted rearward in the load direction include a distal end portion 31 and a base end portion 32. The distal end portion 31 and the base end portion 32 are bent forward at a boundary portion of overlapping between the first slow deformation foam 21 and the second slow deformation foam 22. The rearward-tilt elastic plates 13 are simply directed forward and may be bent at a height position that differs from the position of the boundary portion or may be curved entirely.

As illustrated in FIG. 6B, when an occupant sits on such a seat cushion 5, the first slow deformation foam 21 and the second slow deformation foam 22 are compression deformed. By following the compression deformation of these foams 21 and 22, the rearward-tilt elastic plates 13 disposed to be tilted rearward are further tilted reward.

As described above, in the present embodiment, the slow deformation foam 12 includes the first slow deformation foam 21 and the second slow deformation foam 22 that overlap each other in the load direction. The first slow deformation foam 21 and the second slow deformation foam 22 have mutually different deformation characteristics with respect to load application. The first slow deformation foam 21 is compression deformed easily when being applied with a load. The second slow deformation foam 22 is compression deformed slowly even when being applied with a load. In a state in which the slow deformation foam 12 is compression deformed by a load, the rearward-tilt elastic plates 13 that are bent forward can function to support from below, in a straight direction along the load direction, the buttocks of the sitting occupant with the distal end portion 31 thereof. The seat device 10 can support the buttocks of the sitting occupant synergistically with the deformed slow deformation foam 12 and the rearward-tilt elastic plates 13. In particular, as a result of being bent or curved at the boundary portion between the first slow deformation foam 21 and the second slow deformation foam 22 by following the overlapping structure of the first slow deformation foam 21 and the second slow deformation foam 22, the rearward-tilt elastic plates 13 that are bent forward are easily tilted rearward while maintaining the shape that is curved and bent.

Differently from the above-described embodiment, the rearward-tilt elastic plates 13 are bent forward as a whole. Thus, the rearward-tilt elastic plates 13 are largely tilted rearward as a whole by the weight application of sitting. However, the action of leading the waist part to the rear along the seat becomes small. Note that, even with the small action, the waist part of a correctly sitting occupant is slightly raised in the correct seating location due to the back of the occupant being in contact with the back cushion 6. Consequently, the waist part of the occupant is not easily moved to the front from the correct seating location.

In the present embodiment, the rearward-tilt elastic plates 13 may be disposed as a substantially straight bar-shaped rearward-tilt elastic members, as with the above-described embodiment. In this case, the bar-shaped rearward-tilt elastic members are easily tilted rearward by the compression deformation of the first slow deformation foam 21 and can exert the function of rearwardly supporting the waist of the sitting occupant immediately after the occupant sits. Moreover, after a long sitting period of time, the bar-shaped rearward-tilt elastic members are largely tilted rearward entirely, not only at the upper end portion thereof, by the compression deformation of the second slow deformation foam 22 and can rearwardly support the waist of the sitting occupant strongly during sitting. Both a correction function immediately after seating and an adjustment function during sitting can be achieved.

Third Embodiment

Next, the seat device 10 of the automobile 1 according to a third embodiment of the disclosure will be described. In the present embodiment, illustration and description of the same configurations as those in the above-described embodiments are omitted by using identical signs. In the following description, differences from the above-described embodiments will be mainly described.

Figure 7A:
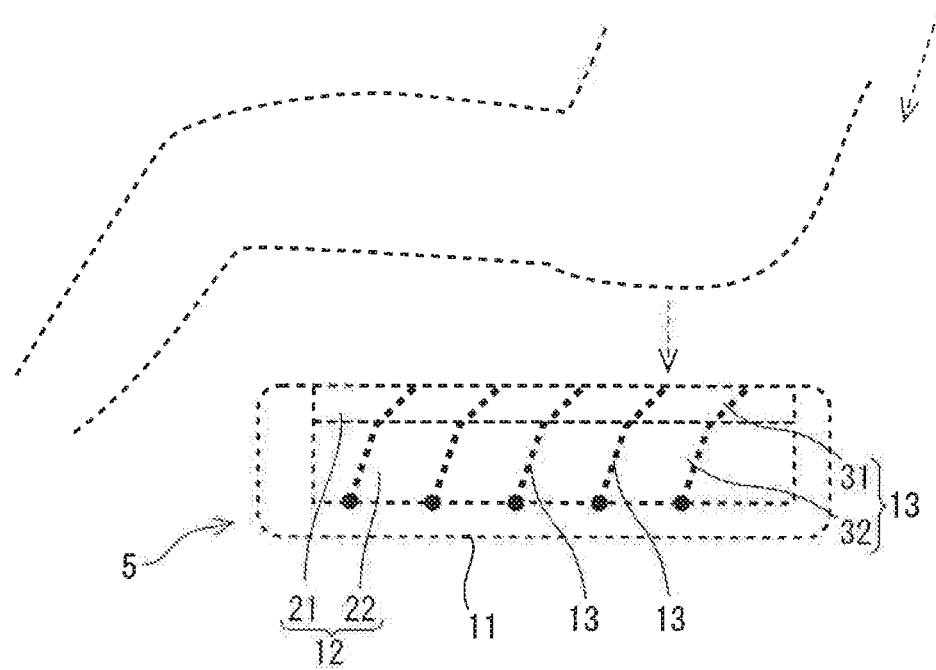
FIG. 7A and FIG. 7B schematically illustrate a structure of a seat cushion of a seat device according to a third embodiment of the disclosure.
Figure 7B:
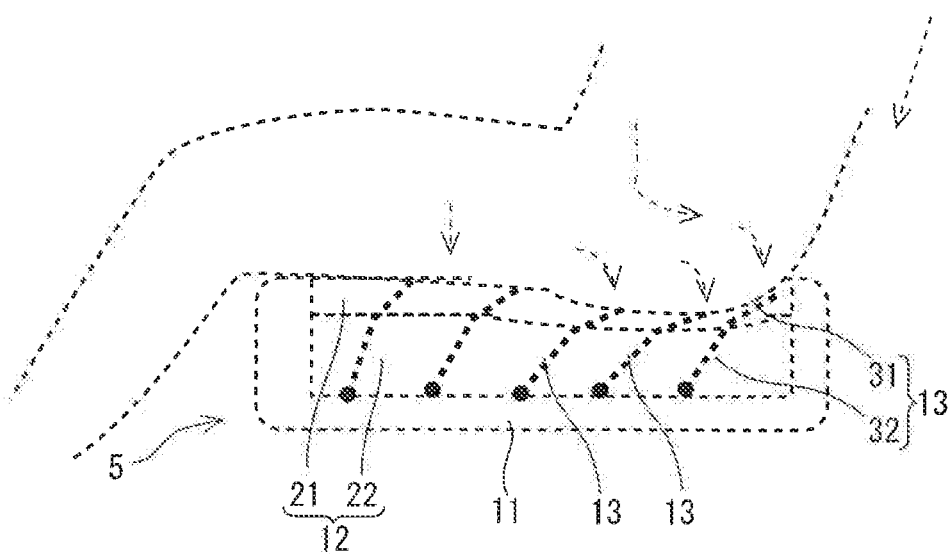

FIG. 7A and FIG. 7B schematically illustrate a structure of the seat cushion 5 of the seat device 10 according to the third embodiment of the disclosure.

FIG. 7A illustrates a state before seating. FIG. 7B illustrates a state after seating.

The seat cushion 5 in FIG. 7A and FIG. 7B includes the cushion body 11, the first slow deformation foam 21, the second slow deformation foam 22, and the plurality of the rearward-tilt elastic plates 13.

The first slow deformation foam 21 and the second slow deformation foam 22 are housed in an upper surface recess in a rear portion of the cushion body 11. The first slow deformation foam 21 is disposed on the second slow deformation foam 22 so as to overlap each other. The first slow deformation foam 21 and the second slow deformation foam 22 overlap each other in the load direction.

The first slow deformation foam 21 and the second slow deformation foam 22 have mutually different deformation characteristics with respect to load application. The first slow deformation foam 21 includes, for example, a low-resilience material having a characteristic of being easily compression deformed compared with the second slow deformation foam 22. The first slow deformation foam 21 may include, for example, a low-resilience material having a characteristic of not being easily compression deformed compared with the second slow deformation foam 22.

In the present embodiment, as illustrated in FIG. 7A, each of the rearward-tilt elastic plates 13 disposed in the inner portion of the slow deformation foam 12 to be tilted rearward in the load direction include a distal end portion 31 and a base end portion 32. The distal end portion 31 and the base end portion 32 are bent rearward at a boundary portion of overlapping between the first slow deformation foam 21 and the second slow deformation foam 22. The rearward-tilt elastic plates 13 are simply directed rearward and may be bent at a height position that differs from the position of the boundary portion or may be curved entirely.

As illustrated in FIG. 7B, when an occupant sits on such a seat cushion 5, the first slow deformation foam 21 and the second slow deformation foam 22 are compression deformed. By following the compression deformation of these foams 21 and 22, the rearward-tilt elastic plates 13 disposed to be tilted rearward are further tilted reward.

As described above, in the present embodiment, the slow deformation foam 12 includes the first slow deformation foam 21 and the second slow deformation foam 22 that overlap each other in the load direction. The first slow deformation foam 21 and the second slow deformation foam 22 have mutually different deformation characteristics with respect to load application. The first slow deformation foam 21 is compression deformed easily when being applied with a load. The second slow deformation foam 22 is compression deformed slowly even when being applied with a load. In a state in which the slow deformation foam 12 is compression deformed by a load, the distal end portions 31 of the rearward-tilt elastic plates 13 that are bent rearward become substantially flat, even when the load is small. The plurality of rearward-tilt elastic plates 13 can stably receive the load in a wide area. As a result, the seat is suppressed from being further lowered. The seat device 10 can support the buttocks of the sitting occupant synergistically with the deformed slow deformation foam 12 and the rearward-tilt elastic plates 13. In particular, as a result of being bent or curved at the boundary portion between the first slow deformation foam 21 and the second slow deformation foam 22 by following the overlapping structure of the first slow deformation foam 21 and the second slow deformation foam 22, the rearward-tilt elastic plates 13 that are bent rearward are easily tilted rearward while maintaining the shape that is curved and bent.

Moreover, the rearward-tilt elastic plates 13 curved or bent rearward can function, even when the slow deformation foam 12 is not largely compression deformed by a load, to rearwardly support a sitting occupant from the front. The seat device 10 can effectively suppress the buttocks from being displaced to the front during sitting.

In addition, the distal ends of the rearward-tilt elastic plates 13 to which a load is applied easily become parallel to the seat of the seat cushion 5 and thus can stably receive the load in a wide area.

In particular, as a result of the rearward-tilt elastic plates 13 being curved or bent at the boundary portion between the first slow deformation foam 21 and the second slow deformation foam 22 by following the overlapping structure of the first slow deformation foam 21 and the second slow deformation foam 22, deformation based on the curve or bend of the rearward-tilt elastic plates 13 can be caused not to be easily impeded by the slow deformation foam 12.

The rearward-tilt elastic plates 13 are bent rearward as a whole, differently from the above-described embodiment.

Thus, while the rearward-tilt elastic plates 13 are largely tilted rearward as a whole by the load application of sitting, the action of leading the waist part to the rear along the seat increases. The waist part of a correctly sitting occupant is raised more than in the correct seating location due to the back of the occupant being in contact with the back cushion 6. Consequently, the waist part of the occupant is not easily moved to the front from the correct seating location.

The above embodiments are examples of embodiments of the disclosure. The disclosure is, however, not limited thereto and can be variously modified or changed in the range not deviating from the gist of the disclosure.

In the above-described embodiment, the rearward-tilt elastic plates 13 are bent or curved once.

Alternatively, for example, the rearward-tilt elastic plates 13 may be bent or curved twice or more.

The rearward-tilt elastic plates 13 may have a bar shape, instead of a plate shape. Even with the bar-shaped rearward-tilt elastic members, by employing a circular shape as the sectional shape thereof or providing a portion thereof with a weak portion and a reinforcement portion, it is possible for the rearward-tilt elastic members to be easily deformed in a specific direction when being applied with a load in an axial direction.

The invention claimed is:

1. A seat device for a vehicle, the seat device comprising:
   a seat cushion on which an occupant in the vehicle is to be seated;
   a slow deformation portion that is housed in a recess, the recess formed in an upper surface of the seat cushion and disposed from a rear portion of the seat cushion in a front-rear direction of the vehicle to a center portion of the seat cushion, and of which slow deformation portion compression deformation to a load is configured to proceed belatedly compared with the seat cushion; and
   a rearward-tilt member that is a plate-shaped elastic plate, and is arranged to be inside the slow deformation portion, the plate-shaped elastic plate extending in the vehicle width direction and configured to extend to be tilted rearward of the vehicle to the up-down direction, wherein,
   when the slow deformation portion is deformed by the load, the rearward-tilt member is tilted rearward from a position before the load is applied.

2. The seat device for a vehicle according to claim 1, wherein, in a state in which no load is applied to the slow deformation portion, the rearward-tilt member is disposed to be tilted rearward.

3. The seat device for a vehicle according to claim 2, wherein the rearward-tilt member includes a plurality of rearward-tilt members, the rearward-tilt members being disposed side by side in a front-rear direction of the vehicle in an area in the seat cushion where the slow deformation portion is disposed.

4. The seat device for a vehicle according to claim 3, wherein the rearward-tilt members are disposed side by side in an area on a front side from a seating location in the seat cushion.

5. The seat device for a vehicle according to claim 3, wherein the rearward-tilt members are disposed side by side in an area in the seat cushion from a seating location to a portion on the front side of the seating location.

6. The seat device for a vehicle according to claim 2, wherein the rearward-tilt member has a shape in which a width in a vehicle width direction of the vehicle is larger than a thickness in a front-rear direction of the vehicle.

7. The seat device for a vehicle according to claim 2, wherein the rearward-tilt member disposed in the load direction in the inner portion of the slow deformation portion is curved or bent forward.

8. The seat device for a vehicle according to claim 2, wherein the rearward-tilt member disposed in the load direction in the inner portion of the slow deformation portion is curved or bent rearward.

9. The seat device for a vehicle according to claim 2, wherein the slow deformation portion comprises a low-resilience material.

10. The seat device for a vehicle according to claim 2,
wherein the slow deformation portion comprises a first slow deformation portion and a second slow deformation portion that overlap each other in the load direction, and
wherein the first slow deformation portion and the second slow deformation portion have mutually different deformation characteristics with respect to a load.

11. The seat device for a vehicle according to claim 10, wherein the rearward-tilt member disposed in the load direction in the inner portion of the slow deformation portion is curved or bent to follow an overlapping structure of the slow deformation portion.

12. The seat device for a vehicle according to claim 1, wherein the rearward-tilt member includes a plurality of rearward-tilt members, the rearward-tilt members being disposed side by side in a front-rear direction of the vehicle in an area in the seat cushion where the slow deformation portion is disposed.

13. The seat device for a vehicle according to claim 12, wherein the rearward-tilt members are disposed side by side in an area on a front side from a seating location in the seat cushion.

14. The seat device for a vehicle according to claim 12, wherein the rearward-tilt members are disposed side by side in an area in the seat cushion from a seating location to a portion on the front side of the seating location.

15. The seat device for a vehicle according to claim 1, wherein the rearward-tilt member has a shape in which a width in a vehicle width direction of the vehicle is larger than a thickness in a front-rear direction of the vehicle.

16. The seat device for a vehicle according to claim 1, wherein the rearward-tilt member disposed in the load direction in the inner portion of the slow deformation portion is curved or bent forward.

17. The seat device for a vehicle according to claim 1, wherein the rearward-tilt member disposed in the load direction in the inner portion of the slow deformation portion is curved or bent rearward.

18. The seat device for a vehicle according to claim 1, wherein the slow deformation portion comprises a low-resilience material.

19. The seat device for a vehicle according to claim 1,
wherein the slow deformation portion comprises a first slow deformation portion and a second slow deformation portion that overlap each other in the load direction, and
wherein the first slow deformation portion and the second slow deformation portion have mutually different deformation characteristics with respect to a load.

20. The seat device for a vehicle according to claim 19, wherein the rearward-tilt member disposed in the load direction in the inner portion of the slow deformation portion is curved or bent to follow an overlapping structure of the slow deformation portion.

21. The seat device for a vehicle according to claim 1, wherein the rearward-tilt member is embedded within material of the slow deformation portion.

22. The seat device for a vehicle according to claim 1, wherein the slow deformation portion is comprised of slow deformation foam.

* * * * *